Figures 1, 2:
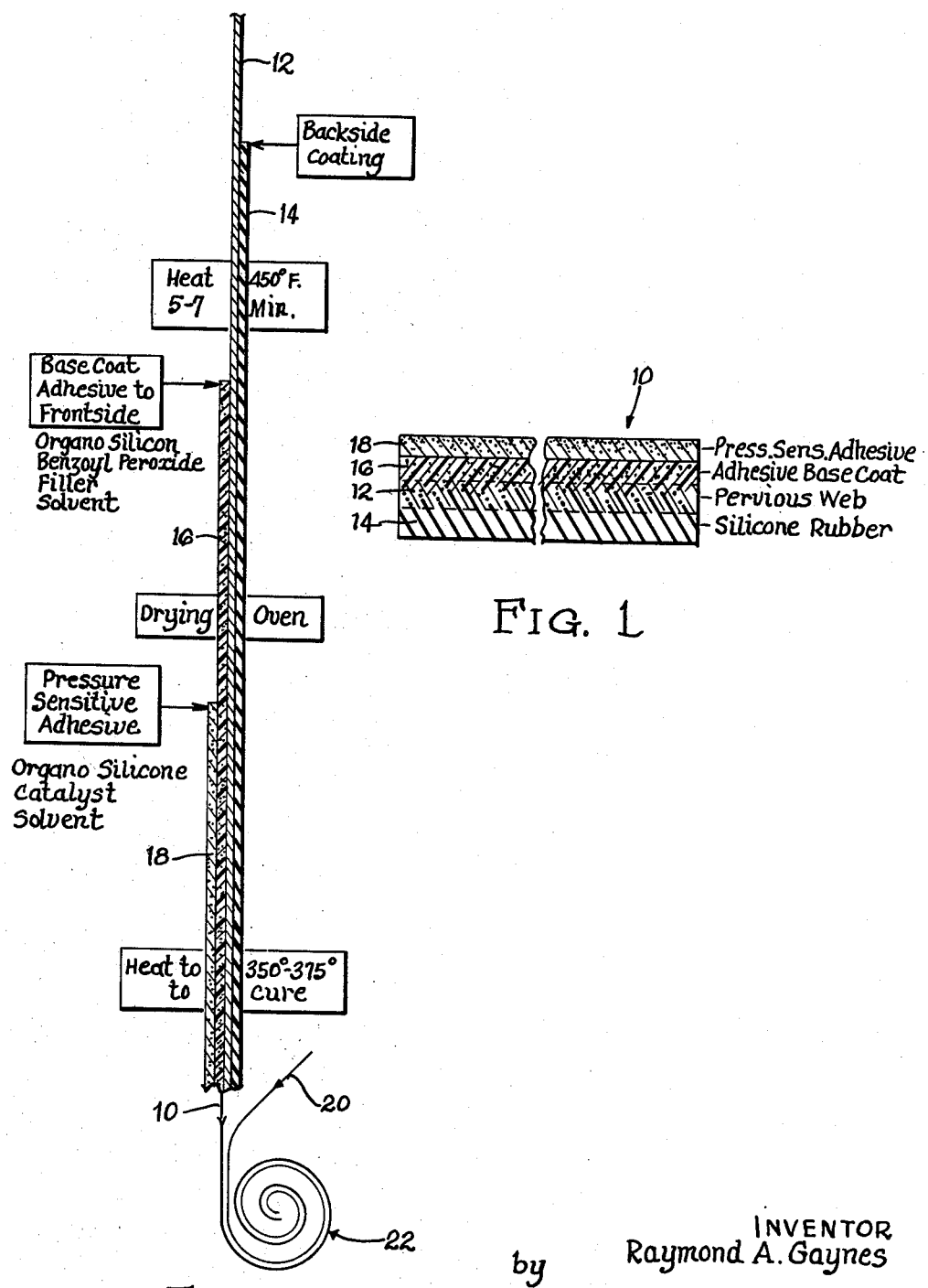

INVENTOR
Raymond A. Gaynes

United States Patent Office 3,161,533
Patented Dec. 15, 1964

3,161,533
PRESSURE-SENSITIVE ADHESIVE TAPE FOR USE AT LOW AND HIGH TEMPERATURES
Raymond A. Gaynes, Chicago, Ill., assignor, by mesne assignments, to Mystik Tape, Inc., a corporation of Illinois
Filed Aug. 25, 1958, Ser. No. 756,784
8 Claims. (Cl. 117—68.5)

The present invention relates generally to the manufacture of pressure-sensitive adhesive tapes, and more particularly, to improved self-fusing pressure-sensitive adhesive tapes having a novel structure formed by a unique process and characterized by its adaptability for use under widely diverse thermal conditions ranging from a low of about −70° up to about 500° F. while maintaining fusibility, flexibility, good electrical properties, corrosion resistance and resistance to weathering.

Up to now, a number of pressure-sensitive adhesive tapes have been manufactured comprising a backing sheet having applied to one of its surfaces a pressure-sensitive adhesive usually formulated of a rubber-resin system, such as resins or resin esters in combination with an elastomer of the type which include natural rubber or a synthetic elastomeric polymer.

The backing sheets heretofore employed are generally selected of a woven textile, such as cotton, or a synthetic resinous film, such as polyvinyl chloride, nitrocellulose and the like. For certain special applications, however, the backing sheets are formed of paper, certain non-woven fabrics of interbonding fibers, and thin metallic films such as tin, lead, aluminum and the like. Generally, the backings are large sheets which are coated with the pressure-sensitive adhesive and thereafter cut into strips or bands of a preselected width and rolled upon a spool for distribution and sale.

While these prior art pressure-sensitive adhesive tapes find great use and possess excellent properties for many diverse applications, it has been found that the foregoing materials used for the backing strips in combination with the rubber-resins used for pressure-sensitive adhesives, are not sufficiently inert to enable these tapes to be used in applications employing extreme temperature conditions, i.e., below 0° F. or above 300° F.

In addition, it has been found that pressure-sensitive adhesives based on rubber-resin systems are further unsuited for such applications because they become embrittled and lose their adhesiveness at low temperatures and their cohesive strength is materially reduced when they are subjected to temperatures above 300° F.

One prior art proposal to overcome these deficiencies is a tape consisting of a pressure-sensitive adhesive of the group generally known as silicones coated upon a film stock of polyethylene and polyethylene derivatives such as polyethylene tetraphthalate or fluorinated polyethylene as represented by tetrafluoroethylene. These tapes were found unsatisfactory because the cohesiveness of the adhesive is greater than its adhesiveness for the film, with the result that the bonding relation between the film and the adhesive is insufficient to prevent separation.

The present invention is based upon my discovery that a self-sealing pressure-sensitive adhesive tape having the desired inertness for use as an insulation material and the desired stability under widely varying, and frequently severe, temperature conditions is obtained with a tape structure formed by coating one surface of a flat web of heat-resistant material with a special silicone rubber composition, curing the composition, thereafter applying a layer of a special pressure-sensitive adhesive formulation to the opposite surface thereof, and heat treating both the composition and the formulation in a manner to be hereinafter more fully described. It has been found, however, that the unique interrelationship of the various steps of my process and the synergistic coaction of the various portions of my tape structure provide a fusible tape.

Accordingly, a prime object of the present invention is to provide an improved self-fusing pressure-sensitive adhesive tape characterized by its adaptability for use under widely diverse thermal conditions ranging from about −70° to about 500° F. while maintaining its fusibility, flexibility, electrical properties, and resistance to corrosion and weathering.

Another object of the present invention is to provide a pressure-sensitive adhesive tape of the type described in which improved physical properties and performance characteristics are effected by the coaction of an especially treated silicone rubber compound back coating and a pressure-sensitive adhesive front coating consisting of an especially treated formulation containing organo-silicon polymers.

Another object of the present invention is to provide a pressure-sensitive adhesive tape of the type described in which a thermal resistant base material is coated on one surface thereof with a silicone rubber compound and is coated on the other surface thereof with a first formulation containing organo-silicon polymers adherently bonded thereto by the cohesive and adhesive forces imparted thereto by an intermediary adhesive second formulation containing organo-silicon polymers.

Still another object of the present invention is to provide an improved method for preparing a fusible pressure-sensitive adhesive tape of the type described in which a heat-resistant material coated with a silicone rubber composition is subjected to heat treatment, coated on its uncoated face with layers of pressure-sensitive silicone adhesive compositions, and thereafter subjected to additional heat treatment.

These and other objects of the invention as shall appear, are fulfilled in a manner which is easily discerned from the following detailed description when read in conjunction with the accompanying drawing, in which:

FIGURE 1 is a cross-sectional showing of a pressure-sensitive adhesive tape embodying the present invention; and FIG. 2 is a flow diagram showing the preparation of the pressure-sensitive adhesive tape embodying the features of this invention.

An illustrative embodiment of the tape prepared in accordance with the process of the invention comprises a pressure-sensitive adhesive tape 10 comprising a base or web portion 12 having one surface coated with a layer 14 of a specially treated silicone rubber compound and a second surface coated with a specially treated layer 16 of a first or base coat pressure-sensitive adhesive formulation upon which is disposed a layer 18 of a second or top coat pressure-sensitive adhesive formulation.

Base or web portion 12 is formed of a heat-resistant material such, for example, as fiberglass cloth, varnished glass coth, asbestos and the like which are further characterized by their electrical properties and flexibility at low temperatures.

Layer 14 is adherently formed upon one surface of web 12 and consists essentially of an organo-siloxane material characterized by excellent dielectric strength and high thermal stability such, for example, as the silicone rubber compound sold by the Dow Corning Corporation of Midland, Michigan, under the trade name "Silastic #132." For various purpose tapes of the general type here described, various compounds of the "Silastic" family of compounds may be substituted for the "Silastic #132" as can the silicone rubber formulations of other manufacturers having the requisite mechanical and thermal properties for the fabrication of the desired tape.

Layer 16 is adherently coated upon the other surface of web 12. When, as in certain alternative embodiments of the present invention, web 12 comprises a more open mesh, layer 14 and layer 16 will fill in the spaces defined by the mesh and form a firm bond between each other.

In the practice of this invention, layer 16 is a base coat adhesive compound containing a pressure-sensitive silicone adhesive as its essential ingredient. Commercial pressure-sensitive silicone adhesive such, for example, as those marketed by Dow-Corning under the trade designations "C–274," "C–269" and "C–271" have been found quite satisfactory materials for the practice of this invention.

In addition to the pressure-sensitive silicone adhesive, the formulation for base coat layer 16 further contains, per 60 parts by weight solids of silicone adhesive (100 parts of 60% solids); from 0.1 to 5 parts by weight of a catalyst selected from the group consisting of benzoyl peroxide and 2-4 dichlorobenzoyl peroxide; from zero to about 30 parts by weight of a heat-resistant filler such, for example, as zinc oxide, titanium oxide, asbestos, silica, magnesium oxide, calcium carbonate, clay, bentonite and like inorganic materials having a melting point in excess of 300° C., and a sufficient quantity of a solvent selected from a group consisting of the aromatic hydrocarbons such, for example, as xylene, toluene, heptane and the like, to provide a formulation having a viscosity suitable for the elected manner of coating.

To aid in the fuller understanding of the present invention, the following examples of base coat formulations are presented and exemplify those which may satisfactorily be employed in the practice of this invention.

EXAMPLE 1

|  | Parts by weight | Solids by weight |
| --- | --- | --- |
| Silicone adhesive (Dow-Corning C–274) (60% solids) | 100 | 60 |
| Zinc oxide | 5 | 5 |
| Benzoyl peroxide | 3 | 3 |
| Xylene | 15 | |

EXAMPLE 2

| Silicone adhesive (Dow-Corning C–274) (60% solids) | 100 | 60 |
| --- | --- | --- |
| Asbestos | 10 | 10 |
| Benzoyl peroxide | 5 | 5 |
| Xylene | 20 | |

EXAMPLE 3

| Silicone adhesive (60% solids) | 100 | 60 |
| --- | --- | --- |
| Titanium dioxide | 30 | 30 |
| 2-4 Dichlorobenzoyl peroxide | 4 | 4 |
| Toluene | 30 | |

EXAMPLE 4

| Silicone adhesive (Dow-Corning C–274) (60% solids) | 100 | 60 |
| --- | --- | --- |
| Silica | 5 | 5 |
| 2-4 Dichlorobenzoyl peroxide | 2 | 2 |
| Heptane | 12 | |

EXAMPLE 5

| Silicone adhesive (60% solids) | 100 | 60 |
| --- | --- | --- |
| Zinc oxide | 3 | 3 |
| Benzoyl peroxide | 2 | 2 |
| Toluene | | |

EXAMPLE 6

| Silicone adhesive (60% solids) | 100 | 60 |
| --- | --- | --- |
| Benzoyl peroxide | 0.1 | 0.1 |
| Heptane | 6 | |

Layer 18, a pressure-sensitive silicone adhesive compound, is adherently formed upon layer 16. Layer 18 is a compound containing a pressure-sensitive silicone adhesive as its principal ingredient. Commercial pressure-sensitive silicone adhesive such, for example, as those marketed by Dow-Corning under the trade designations "C–274," "C–269" and "C–271" have been found quite satisfactory materials for the formulation of layer 18.

In addition to the aforedescribed pressure-sensitive silicone adhesive, the formulation for top coat layer 18 further contains, per 60 parts by weight solids of the silicone adhesive (100 parts by weight of 60% solids): from 0.1 up to 5 parts by weight of a catalyst selected from the group consisting of benzoyl peroxide, 2-4 dichlorobenzoyl peroxide, the tertiary butylamine; and a sufficient quantity of a solvent selected from a group consisting of the aromatic hydrocarbons such, for example, as xylene, toluene, heptane and the like, to provide a formulation having a viscosity suitable for the elected manner of coating. The amount of catalyst introduced into the coating compositions of layers 16 and 18 is insufficient to cause cure of the resinous adhesive.

To further aid in the more complete understanding of the present invention, the following examples of top coat formulations are presented and exemplify those which may satisfactorily be employed in the practice of this invention.

EXAMPLE 7

| Silicone adhesive (Dow-Corning C–274) (60% solids) | 100 | 60 |
| --- | --- | --- |
| Tributylamine | 3 | 3 |
| Xylene | 15 | |

EXAMPLE 8

| Silicone adhesive (Dow-Corning C–274) (60% solids) | 100 | 60 |
| --- | --- | --- |
| Benzoyl peroxide | 0.5 | 0.5 |
| Toluene | 20 | |

EXAMPLE 9

| Silicone adhesive (60% solids) | 100 | 60 |
| --- | --- | --- |
| 2-4 Dichlorobenzoyl peroxide | 2 | 2 |
| Heptane | 25 | |

EXAMPLE 10

| Silicone adhesive (60% solids) | 100 | 60 |
| --- | --- | --- |
| Benzoyl peroxide | 0.2 | 0.2 |
| Xylene | 12 | |

EXAMPLE 11

| Silicone adhesive (60% solids) | 100 | 60 |
| --- | --- | --- |
| 2-4 Dichlorobenzoyl peroxide | 0.1 | 0.1 |
| Toluene | 6 | |

EXAMPLE 12

| Silicone adhesive (60% solids) | 100 | 60 |
| --- | --- | --- |
| Tributylamine | 1 | 1 |
| Toluene | 12 | |

The process followed in the manufacture of the tape heretofore described is an important aspect of the present invention if the improved results thereof are to be realized. I shall, therefore, now describe in detail the process of this invention. While in the foregoing Examples 1–12, illustration is made of the silicone component as 100 parts of 60% solids, it will be understood that adhesives of different solids content ranging from 40–100 percent may be used with corresponding change in the amount thereof for use as an ingredient in the composition.

In one exemplary embodiment of the present invention a suitable web material 12, such for example as woven fiberglass, is selected. Upon one surface of web 12, a layer 14 of silicone rubber compound such as "Silastic #132" is coated as a 30–45% dispersion in an aromatic hydrocarbon solvent such as xylene, toluene and the like. Any of the well known methods for coating, such for example as knife coating, spraying, dipping, painting and the like, may be employed to deploy the silicone rubber compound upon web 12 in the practice of this invention.

After the web 12 has been coated upon one surface with a layer 14 of silicone rubber compound, the coated web is heated gradually to a temperature of about 450° F. and there held for from 5–7 minutes to dispel the solvent and to advance the rubber to a set stage.

When the silicone rubber layer 14 has reached its desired state of cure, the coated web 12 is removed from the heated atmosphere and may be cooled.

Next, the other surface of the web 12 is coated in a similar manner with a layer 16 of a base coat adhesive of the type represented by Examples 1–6. Layer 16 bonds itself to web 12 and to portions of layer 14 extending into the openings of the mesh of web 12. While any suitable method of coating may be again employed, it has been found that knife coating is a preferred method when a relatively viscous base coat formulation is employed, whereas for those formulations which are more liquid in nature, spraying, dipping and painting provide quite satisfactory results. As previously mentioned, the base coat formulation of this invention includes varying the quantity of solvent employed therein in order to adjust the consistency of the mixture to substantially provide the maximum workability for the method of coating adopted.

After the base coat layer 16 has been coated upon web 12, and after layer 16 has completely dried, a top coat layer 18 of a pressure-sensitive adhesive compound is coated in a similar manner upon layer 16. Layer 18, a formulation of the type represented by Examples 7–12, is integrally bonded to web 12 by the action of the base coat layer 16.

When layer 18 has been coated, the adhesive side of the tape structure 10 is heated to a temperature of from 350–375° F. where it is maintained for about 3 minutes to eliminate the diluents and advance the coating to a hardened and cohesive state and advancing the resin to cured state. It is preferred to leave the resin in a partially cured state for better fusion with other layers in use, and to provide an adhesive which is responsive to pressure.

The cured state of the silicone rubber layer 14 and the pressure-sensitive adhesive layer 18 provides an interaction which permits an excellent bond to be formed therebetween. Thus when the tape 10 is wrapped or partially lapped upon itself, the interaction of layers 14, 18 cause them to fuse together to provide a bond which is difficult to break and will completely seal out dirt and moisture from the article about which the tape is wrapped.

Because of the intense fusibility provided by the layers 14, 18, in the process of this invention it is essential to use a liner 20 composed of a relatively inert material such, for example, as Holland cloth, intermediate adjacent wraps of the tape 10 as it is wrapped about a suitable spool 22. Liner 20 is removed, then, when the tape is to be used.

It is, of course, understood that while certain illustrative embodiments of the present invention have been herein described, such applications and modifications of the various procedures and formulations as may be readily apparent to one skilled in the art are intended within the spirit of the present invention, especially as it is defined by the appended claims.

I claim:

1. The method of preparing a self-sealing, thermally stable, pressure-sensitive adhesive tape comprising: providing a flexible backing sheet having interstices extending crosswise therethrough, coating the backside of said flexible backing sheet with a curable silicone rubber composition capable of plastic flow in the applied condition to extend at least part way through the interstices of the backing sheet while providing a continuous coating over the backside thereof, advancing the curable silicone rubber composition to an advanced stage of cure, coating the frontside of the flexible backing sheet with a curable pressure-sensitive silicone adhesive containing a curing catalyst and from 0 to 30 parts by weight filler per 60 parts by weight of the silicone adhesive and which is capable of flow in the applied condition sufficient to fill the remainder of the interstices through the flexible backing sheet for communication with the silicone rubber composition in the advanced stage of cure on the backside of the flexible backing sheet, applying a second coating of a curable pressure-sensitive silicone adhesive containing a curing catalyst but without filler onto the previously applied coating on the frontside of the flexible backing sheet, and heating the composite structure to advance the coating to a set stage during which the silicone rubber coating on the backside of the flexible backing sheet and the pressure-sensitive silicone adhesive in the first layer on the frontside of the flexible backing sheet become integrated one with the other at their communicating interfaces.

2. The method of preparing a self-sealing, thermally stable, pressure-sensitive adhesive tape as claimed in claim 1 in which the flexible backing sheet is formed of a fibrous material having interstices between the fibers extending crosswise therethrough.

3. The method of preparing a self-sealing, thermally stable, pressure-sensitive adhesive tape as claimed in claim 1 in which the flexible backing sheet comprises a glass fiber fabric.

4. The method of preparing a self-sealing, thermally stable, pressure-sensitive adhesive tape as claimed in claim 1 in which the flexible backing sheet comprises a fabric formed of asbestos fibers.

5. The method of preparing a self-sealing, thermally stable, pressure-sensitive adhesive tape as claimed in claim 1 in which the first coating on the frontside of the flexible backing sheet is formulated to contain 0.1 to 5 parts by weight of a curing catalyst per 60 parts by weight solid of the silicone adhesive and from 0 to 30 parts by weight of filler per 60 parts by weight solid of the silicone adhesive.

6. The method of preparing a self-sealing, thermally stable, pressure-sensitive adhesive tape as claimed in claim 1 in which the second coating applied on top of the first coating on the frontside of the flexible backing sheet contains 0.1 to 5 parts by weight of curing catalyst per 60 parts by weight solid of the pressure-sensitive silicone adhesive.

7. The method of preparing a self-sealing, thermally stable, pressure-sensitive adhesive tape as claimed in claim 1 in which the silicone rubber composition applied to the backside of the flexible backing sheet is advanced by heating to a temperature of about 450° F. for about 5 to 7 minutes.

8. The method of preparing a self-sealing, thermally stable, pressure-sensitive adhesive tape as claimed in claim 1 in which the composite structure is heated to a temperature of 325 to 375° F. for about 3 minutes.

References Cited in the file of this patent

UNITED STATES PATENTS

| | | |
|---|---|---|
| 2,708,289 | Collings | May 17, 1955 |
| 2,732,213 | Keil | Jan. 24, 1956 |
| 2,750,314 | Bemmels | June 12, 1956 |
| 2,814,601 | Currie et al. | Nov. 26, 1957 |
| 2,816,348 | Adamik | Dec. 17, 1957 |
| 2,857,356 | Goodwin | Oct. 21, 1958 |
| 2,882,183 | Bond et al. | Apr. 14, 1959 |